(12) United States Patent
Giffard

(10) Patent No.: US 11,159,553 B2
(45) Date of Patent: Oct. 26, 2021

(54) DETERMINING EXPLOIT PREVENTION USING MACHINE LEARNING

(71) Applicant: Webroot Inc., Broomfield, CO (US)

(72) Inventor: Jonathan Giffard, Donisthorpe (GB)

(73) Assignee: Webroot Inc., Broomfield, CO (US)

( * ) Notice: Subject to any disclaimer, the term of this patent is extended or adjusted under 35 U.S.C. 154(b) by 178 days.

(21) Appl. No.: 15/952,656

(22) Filed: Apr. 13, 2018

(65) Prior Publication Data

US 2019/0319978 A1    Oct. 17, 2019

(51) Int. Cl.
*H04L 29/06* (2006.01)
*G06N 20/00* (2019.01)
*G06F 16/22* (2019.01)

(52) U.S. Cl.
CPC ...... *H04L 63/1433* (2013.01); *G06F 16/2255* (2019.01); *G06N 20/00* (2019.01)

(58) Field of Classification Search
CPC .. H04L 63/1433; G06F 16/2255; G06N 20/00
See application file for complete search history.

(56) References Cited

U.S. PATENT DOCUMENTS

| | | | | |
|---|---|---|---|---|
| 2012/0240185 A1* | 9/2012 | Kapoor | ............... | H04L 41/0866 726/1 |
| 2015/0143502 A1* | 5/2015 | Peterson | ............. | H04L 63/0245 726/11 |
| 2016/0063379 A1* | 3/2016 | Adderly | ................... | G06N 5/04 706/11 |
| 2017/0207980 A1* | 7/2017 | Hudis | ................... | H04L 41/145 |
| 2017/0353477 A1* | 12/2017 | Faigon | ................... | G06N 7/005 |
| 2018/0060208 A1* | 3/2018 | White, Jr. | ............... | G06F 21/53 726/55 |
| 2018/0316711 A1* | 11/2018 | Iyer | ...................... | H04L 63/1433 |
| 2019/0281476 A1* | 9/2019 | Lyon | ...................... | H04W 24/04 |

* cited by examiner

*Primary Examiner* — Joseph P Hirl
*Assistant Examiner* — Chi D Nguy
(74) *Attorney, Agent, or Firm* — Sprinkle IP Law Group

(57) ABSTRACT

Examples of the present disclosure describe systems and methods for determining exploit prevention software settings using machine learning. In aspects, exploit prevention software may be used to identify processes executing on a computing device. Metadata for the identified processes may be determined and transmitted to a machine learning system. The machine learning system may use an exploit prevention model to determine exploit prevention configuration settings for each of the processes, and may transmit the configuration setting to the computing device. The computing device may implement the configuration settings to protect the processes and monitor the stability of the protected processes as they execute. The computing device may transmit the stability data to the machine-learning system. The machine-learning system may then modify the exploit prevention model based on the stability data.

20 Claims, 5 Drawing Sheets

DETERMINING EXPLOIT PREVENTION USING MACHINE LEARNING

BACKGROUND

Exploit prevention software occupies a critical role in detecting malware and thwarting malware from compromising processes executing in computing environments. However, many processes are not easily protected from malware. For example, some processes may crash immediately or become unstable over time when exploit prevention software is implemented. To mitigate these scenarios, exploit prevention software must be specifically configured with settings for each of the affected processes. However, such configurations are time consuming and are prone to human error.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for determining exploit prevention software settings using machine learning. In aspects, exploit prevention software may be used to identify processes executing on a computing device. Metadata for the identified processes may be determined and transmitted to a machine learning system. The machine learning system may use an exploit prevention model to determine exploit prevention configuration settings for each of the processes, and may transmit the configuration setting to the computing device. The computing device may implement the configuration settings to protect the processes and monitor the stability of the protected processes as they execute. The computing device may transmit the stability data to the machine-learning system. The machine-learning system may then modify the exploit prevention model based on the stability data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
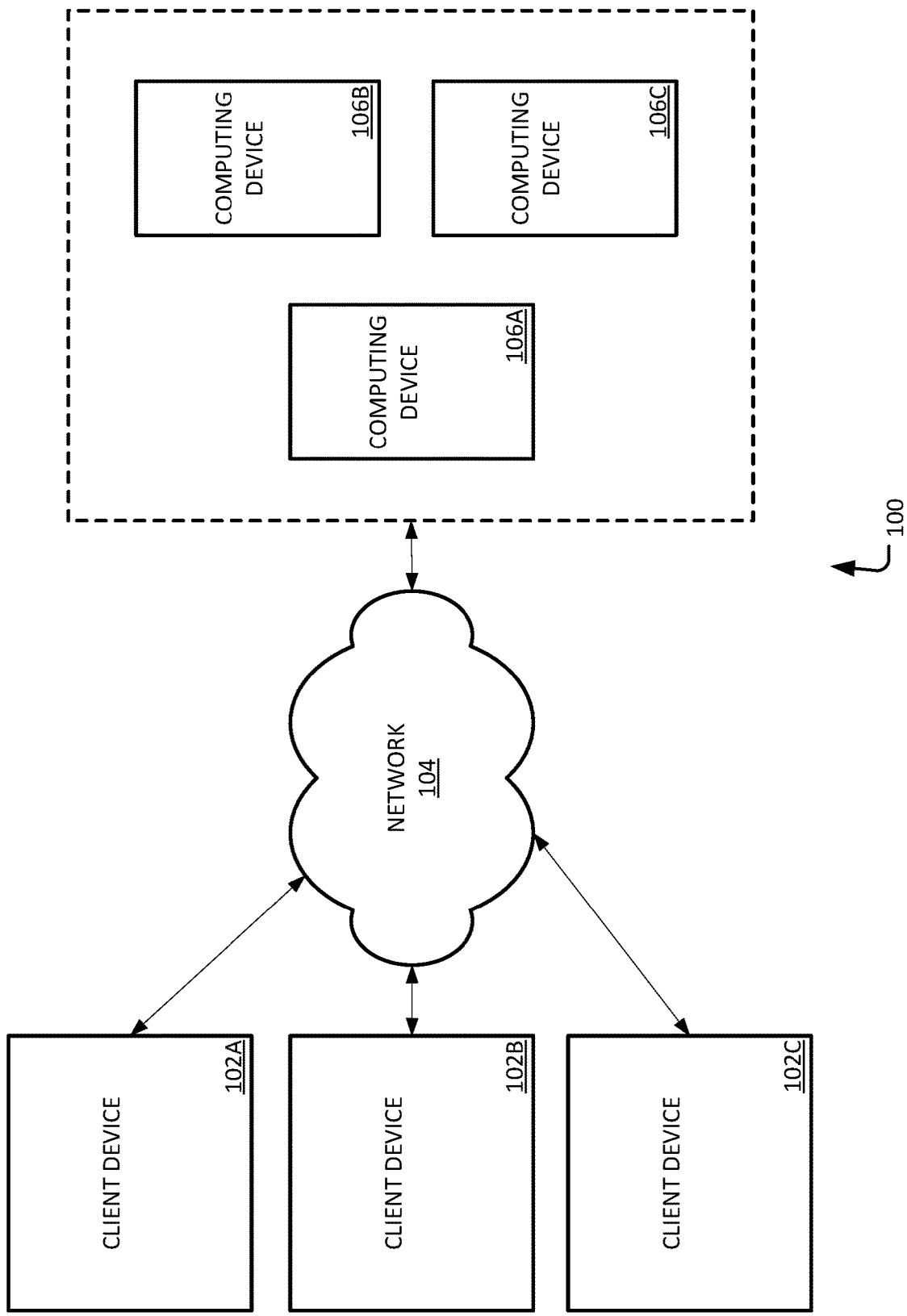
FIG. 1 illustrates an overview of an example system for determining exploit prevention software settings using machine learning as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Given the torrid pace of technological advances in computing and the continued expansion of Internet of Things (IoT) devices, exploit prevention is an ever-present consideration. For many IoT devices, conventional exploit prevention software is implemented to detect and monitor active computer processes. However, the exploit prevention software is not always compatible with the computer processes it is attempting to protect. For example, after the exploit prevention software is applied to a system, many processes may crash immediately or become unstable over time. Generally, in response, an update or patch will be applied to the exploit prevention software, or an Administrator will repeatedly adjust (tweak) the configuration setting for the exploit prevention software. Neither of these response is adequate, as the former is often untimely and inflexibly applied, and the latter is time consuming and prone to suboptimal correlations/analysis. As a result, exploit prevention software is often unused, disabled, or removed.

To address these problems with conventional systems, the present disclosure describes systems and methods for determining exploit prevention software settings using machine learning. In aspects, exploit prevention software may be implemented on or across one or more computing devices. The exploit prevention software may be used to identify processes executing on a computing device. Process metadata for at least a portion of the identified processes may be determined and transmitted to a machine learning system or platform. Process metadata, as used herein, may refer to, for example, process name and/or identifier, methods and/or functions used by a process, objects used during execution of the process, and the like. The machine learning system may use one or more exploit evaluation models to determine exploit prevention configuration settings for each of the identified processes. A model, as used herein, may refer to a predictive or statistical model that may be used to determine a probability distribution over one or more character sequences, classes, objects, result sets or events, and/or to predict a response value from one or more predictors. A model may be a rule-based model, a machine learning regressor, a machine-learning classifier, a neural network, or the like. In aspects, the exploit evaluation model may compare the process metadata against cached process information or a list of known or suspected process values. If a match is determined, the configuration settings corresponding to the matched data may be selected or identified. Alternately, the exploit evaluation model may evaluate the process metadata using fuzzy logic or one or more heuristics to determine the most relevant configuration settings.

The machine learning system may transmit identified configuration settings for the processes to the computing device. The computing device may implement the received configuration settings for the processes into the exploit prevention software to provide protection for the processes. Implementing the configuration settings may comprise updating one or more setting, installing an update, installing a new application/service, incorporating or training a model, or the like. After the configuration settings have been applied, the computing device may monitor the stability of the protected processes as they execute. Monitoring the stability may include collecting system statistics, process/application metrics, evaluating system and process logs, identifying process metadata, etc. The computing device may store the stability data locally and/or transmit the stability data to the machine-learning system. The machine-learning system may then use the stability data to train the exploit prevention model, generate a new exploit prevention model, or otherwise modify exploit prevention techniques. The exploit prevention model, thus, provides for the dynamic, intelligent, and timely configuration of exploit prevention software Accordingly, the present disclosure provides a plurality of technical benefits including but not limited to: increasing system stability through the use of optimized exploitation prevention settings; increasing the compatibility of exploit prevention software and computing systems; increasing the effectiveness of exploit prevention software using process stability feedback loop; decreasing the time to identify/generate exploit prevention configuration setting for a process; and generating and implementing process-specific exploit prevention, among other examples.

FIG. 1 illustrates an overview of an example system for determining exploit prevention software settings using machine learning, as described herein. Example system 100 presented is a combination of interdependent components that interact to form an integrated whole for monitoring the security privileges of a process. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 5. In other examples, the components of systems disclosed herein may be spread across multiple devices. For instance, input may be entered or detected on a client device and information may be processed or accessed from other devices in a network, such as one or more server devices.

As one example, the system 100 comprises client devices 102A-C, distributed network 104, and a distributed server environment comprising computing devices 106A-C. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client devices 102A-C may individually incorporate or have access to exploit prevention software. The exploit prevention software may be installed on each of client devices 102A-C, or aspects of the exploit prevention software may be distributed across one or more of client devices 102A-C. The exploit prevention software may be configured to provide multi-vector protection and threat intelligence services for endpoints and networks by detecting, monitoring, preventing, and/or mitigating malware attacks and suspected threats. In examples, the exploit prevention software may identify, or facilitate the identification of, a list of processes executing on a computing device. Processes may be identified and/or recorded using any known process identifying or process management techniques. Process metadata for at least a portion of the identified processes may also be identified and/or collected. The process metadata may include data, such as sections of a file, resources accessed by the process, strings used in (or output by) the process, objects used during execution of the process, etc. In some aspects, the exploit prevention software may use at least a portion of the process metadata to create and identifier for the corresponding process or an associated executable file. In at least one example, creating the identifier may comprise using one or more cryptographic algorithms to generate a hash value. The hash value may increase the security of the process metadata by, for example, preventing clear text process data and metadata from being exposed to third parties. The process identifier and/or the process metadata may be transmitted by one or more of client devices 102A-C to a machine learning system.

Server devices 106A-C may be incorporate or have access to a machine learning system. In aspects, a machine learning system may be installed on each of server devices 106A-C, or aspects of the machine learning system may be distributed across one or more of server devices 106A-C. The machine learning system may be configured to evaluate and determine exploit prevention techniques for processes executing on one or more client device. The machine learning system may have access to one or more statistical and/or predictive models for determining exploit prevention configuration settings for identified processes. In examples, the machine learning system may receive process identifiers and/or the process metadata from client devices, such as client devices 102A-C. Server devices 106A-C may provide the process identifiers and/or the process metadata as input to the machine learning system. The machine learning system may engage the model to generate configuration settings for processes corresponding to the process identifiers and/or the process metadata. Generating the configuration setting may include using one or more rule sets, evaluating one or more lists (e.g., a white list, black list, grey list, etc.), applying one or more sets of exploitation heuristics, or the like. Server devices 106A-C may transmit the generated configuration settings to the client device(s) that provided the process identifiers and/or the process metadata.

Client devices 102A-C may be further configured to implement exploit prevention configuration settings received from the machine learning system. In aspects, a client device may receive exploit prevention configuration settings for various processes executing on the client device. The client device may implement the exploit prevention configuration settings for one or more of the indicated processes. Implementing the exploit prevention configuration settings may comprise restarting the system or the corresponding process/application/service, installing an update or patch, modifying a set of configuration settings, or the like. After the exploit prevention configuration settings have been implemented on the client device, the client device may monitor the affected processes. Monitoring the affected processes may comprise collecting stability statistics for the client device system, collecting stability statistics for the individual processes, evaluating process statuses, evaluating log data, evaluating various checkpoints in the executing code, detecting one or more system or network events, etc. In some aspects, the client device may transmit at least a portion of the monitored data to the machine learning system. In at least one aspect, the client device may hash or otherwise encode the data (as previously described) prior to transmitting the monitored data to the machine learning system.

Server devices 106A-C may be further configured to use monitored data from a client device to adjust the machine learning system. In aspects, a server device may receive monitored data from a client device. The server device may analyze the data to identify at least stability statistics and metadata for one or more processes. The server device may use the stability statistics and metadata to adjust the machine learning system and/or one or more models associated with the machine learning system. The updated machine learning system may then be used subsequently when the server device receives process identifiers and/or the process metadata from a client device. Thus, server devices 106A-C and client devices 102A-C benefit from a feedback loop of client-based stability metrics and machine learning system adjustments.

Figure 2:
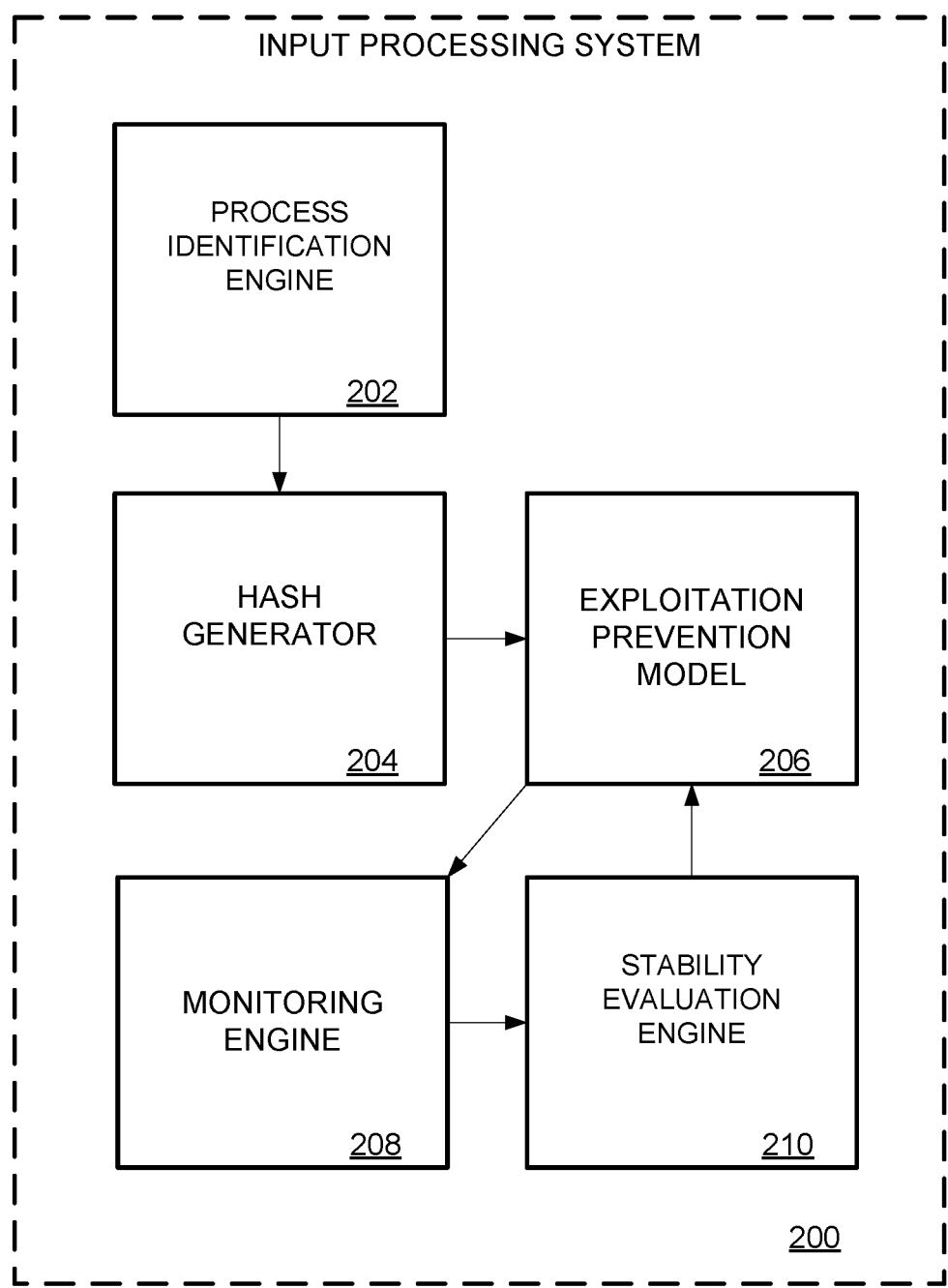
FIG. 2 illustrates an exemplary input processing system for determining exploit prevention software settings using machine learning as described herein.

FIG. 2 illustrates an overview of an exemplary input system unit 200 for determining exploit prevention software settings using machine learning, as described herein. The exploit prevention techniques implemented by input processing system 200 may comprise the processing techniques and content described in FIG. 1. In alternative examples, a distributed system (comprising one or more components such as processor and/or memory) may perform the processing described in system 200.

With respect to FIG. 2, input processing system 200 may comprise process identification engine 202, hash generator 204, exploitation prevention model 206, monitoring engine 208, and stability evaluation engine 210. Identification engine 202 may be configured to identify executing process and/or process metadata associated therewith. In aspects, process identification engine 202 may have access to process information one or more computing devices. Identification engine 202 may evaluate the process information to determine, for example, currently executing processes, processes created and/or terminated over a particular time period, process states, process metadata, etc. Evaluating the process information may include the use of any known process identifying or process management techniques. In some examples, process identification engine 202 may arrange or prioritize the process information according to one or more criteria. For example, the process information may be arranged by the application/service that created the process, a process priority value, process resource allocation or usage, process identifier, a security value, process runtime or projected runtime, etc. Identification engine 202 may collect and/or record the process information in an accessible storage location.

Hash generator 204 may be configured to generate one or more values from the process information. In aspects, hash generator 204 may have access to process information collected/identified by identification engine 202. Hash generator 204 may apply one or more algorithms, functions, or rule sets to the process information (or to a file corresponding to the process information) to secure and/or obfuscate the process information. For example, hash generator 204 may apply a cryptographic hash function to the process information, such as MD5, SHA-1, SHA-2, SHA-3, etc. The cryptographic hash function may output one or more hash values (hashes) or digests. The hashes may comprise or represent data, such as file sections, resources accessed by the process, strings used in (or output by) the process, objects used during execution of the process, etc. Hash generator 204 may store the hashes and/or provide the hashes to a machine learning component, such as exploitation prevention model 206.

Exploitation prevention model 206 may be configured to evaluate and determine exploit prevention techniques for one or more processes. In aspects, exploitation prevention model 206 may receive one or more hashes or digests as input. In some such aspects, exploitation prevention model 206 may evaluate the hashes to identify one or more processes. Identifying the processes may comprise applying a data parsing utility to the hashes in order to identify process identifiers and corresponding process information. In alternate aspects, exploitation prevention model 206 may simply identify a hash identifier for the hashes. For each identified process, process identifier, and/or hash identifier, exploitation prevention model 206 may attempt to determine exploitation prevention configuration settings. In some aspects, determining exploitation prevention configuration settings may comprise comparing the identified process, process identifier, and/or hash identifier to one or more data sources. Examples of data sources may include exploit prevention software/services, "whitelists" of known safe processes/configuration settings, "blacklists" of known or suspected unsafe processes/configuration settings, virus definitions, and the like. The data sources may comprise known or previously evaluated process identifiers (e.g., process name, process identifier, hash identifier, etc.) and one or more sets of corresponding configuration settings. In at least one aspect, the data sources may comprise one or more configuration settings for each process. For example, for a single process, a data source may comprise multiple configuration settings relating to various levels of security, stability, efficiency, resource utilization, or the like. Comparing a received hash information (e.g., identified process, process identifier, and/or hash identifier) to the process identifiers in a data source may comprise using pattern matching techniques, fuzzy logic, or one or more rule sets. When a match (or an approximate match) is indicated by the comparison, exploitation prevention model 206 may automatically select a set of configuration settings based on one or more predefined criteria. Alternately, exploitation prevention model 206 may provide a list of available configuration setting to a user via a user interface. The user interface may enable the user to select or otherwise indicate a configuration setting for a process. Exploitation prevention model 206 may provide one or more configuration settings to a monitoring component, such as monitoring engine 208.

Monitoring engine 208 may be configured to monitor processes as the processes are executing. In aspects, monitoring engine 208 may have access to the configuration settings determined by exploitation prevention model 206. Monitoring engine 208 may apply one or more of the configuration settings to the computing device(s) executing the processes corresponding to the configuration settings. Alternately, one or more separate components of input processing system 200 may apply at least a portion of the configuration settings to the computing device(s) executing the processes corresponding to the configuration settings. In examples, applying the exploitation prevention configuration settings may comprise restarting the system, restarting the computing device(s), restarting one or more processes, applications or services, downloading/installing an update or patch, modifying a set of configuration settings, or the like. After configuration settings have been applied to one or more processes, monitoring engine 208 may monitor the processes. Monitoring the processes may comprise collecting system/process statistics for input processing system 200, collecting statistics for the individual processes, evaluating process statuses, evaluating process and event log data, evaluating various checkpoints in the executing code (via, for example, a debugging utility), etc. In examples, the statistics and information monitored by monitoring engine 208 may be predefined by a user or configuration file or determined dynamically by monitoring engine 208. Moreover, the statistics and information monitored by monitoring engine 208 may be different for one or more processes. In aspects, after a period of monitoring, at least a portion of the monitored statistics may be collected and/or provided to a process stability evaluation component, such as stability evaluation engine 210.

Stability evaluation engine 210 may be configured to evaluate the stability of one or more processes. In aspect, stability evaluation engine 210 may have access to a set of monitored process data. Stability evaluation engine 210 may evaluate the monitored process data to determine the stability of one or more processes. Evaluating the monitored process data may comprise analyzing aspects of the system performance of input processing system 200, such as overall system health and stability, process health and stability, resource utilization, system and application/service processing speed, task performance quality and completion statistics, system and process security, etc. For example, stability evaluation engine 210 may compare a set of process stability data (e.g., average process runtimes, number of process crashes, number of reported errors/exceptions, process exit values, etc.) to a previously collected set of process stability data to determine whether processes (or the system) have become more or less stable. Based on the evaluation of the monitored process data, stability evaluation engine 210 may generate scores, metrics, or labels for one or more process configuration settings. The scores, metrics, or labels may indicate a level of stability, priority, or recency for a process configuration setting. For instance, a process configuration setting may be assigned a label of "stable" or may receive a stability score of 4.8 out of 5.

Stability evaluation engine 210 may be further configured to cause exploitation prevention model 206 to be adjusted. In aspects, stability evaluation engine 210 may provide labeled or unlabeled process data and/or process configuration settings as input to exploitation prevention model 206. Exploitation prevention model 206 may be trained or adjusted using the received data. For example, exploitation prevention model 206 may have access to a set of historical process stability statistics/metrics/labels and/or process configuration settings. Exploitation prevention model 206 may evaluate recently received process data against the historical data to determine whether to implement or incorporate a new set of process configuration settings. In some aspects, when exploitation prevention model 206 is updated or adjusted, an updated set of process configuration settings is provided to monitoring engine 208. The process of monitoring the processes associated with updated process configuration settings, and stability evaluation using stability evaluation engine 210 may continue until one or more processes is stable or the process terminates.

Figure 3:
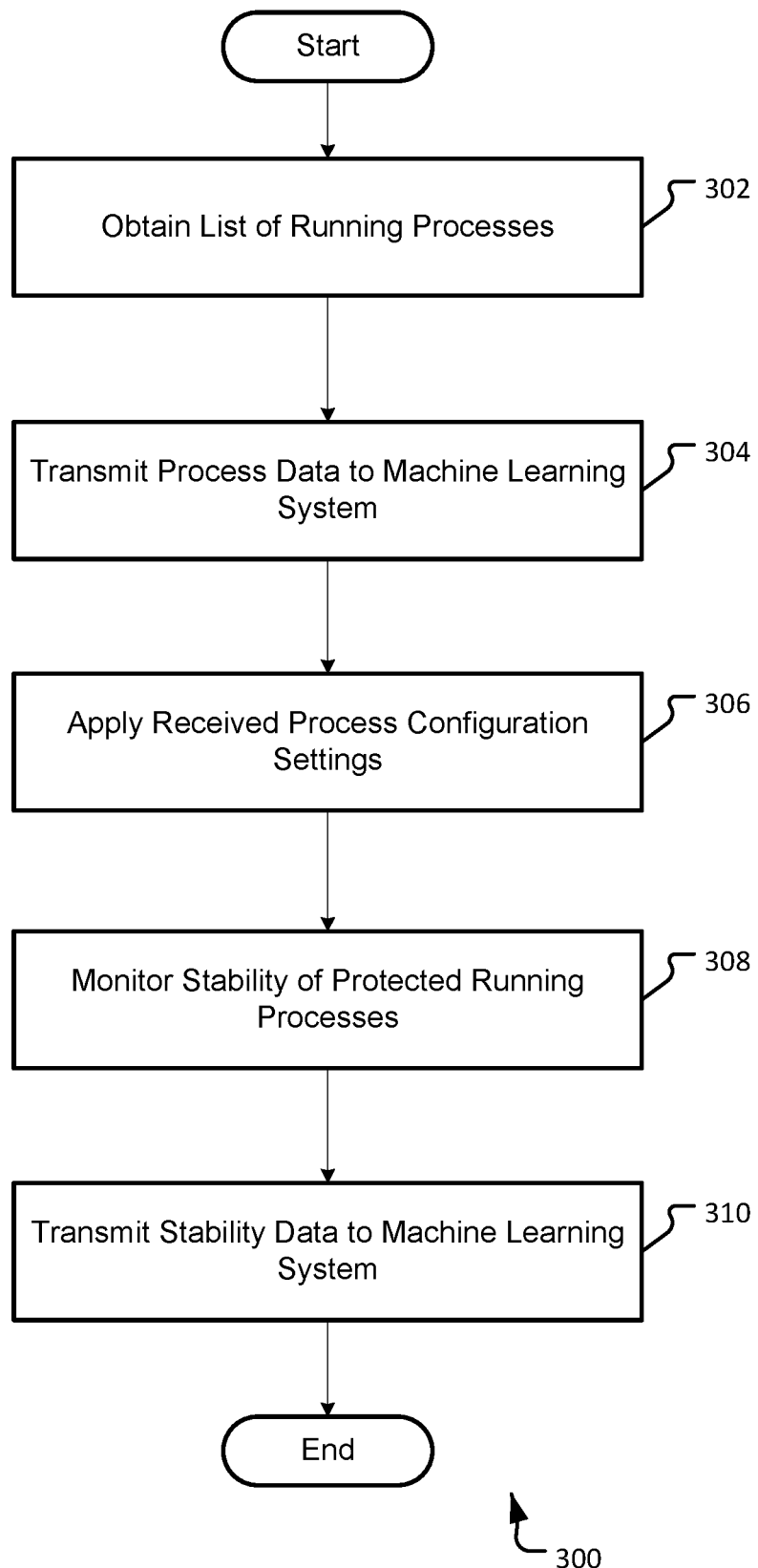
FIG. 3 illustrates an example method for implementing and monitoring exploit prevention software settings as described herein.
Figure 4:
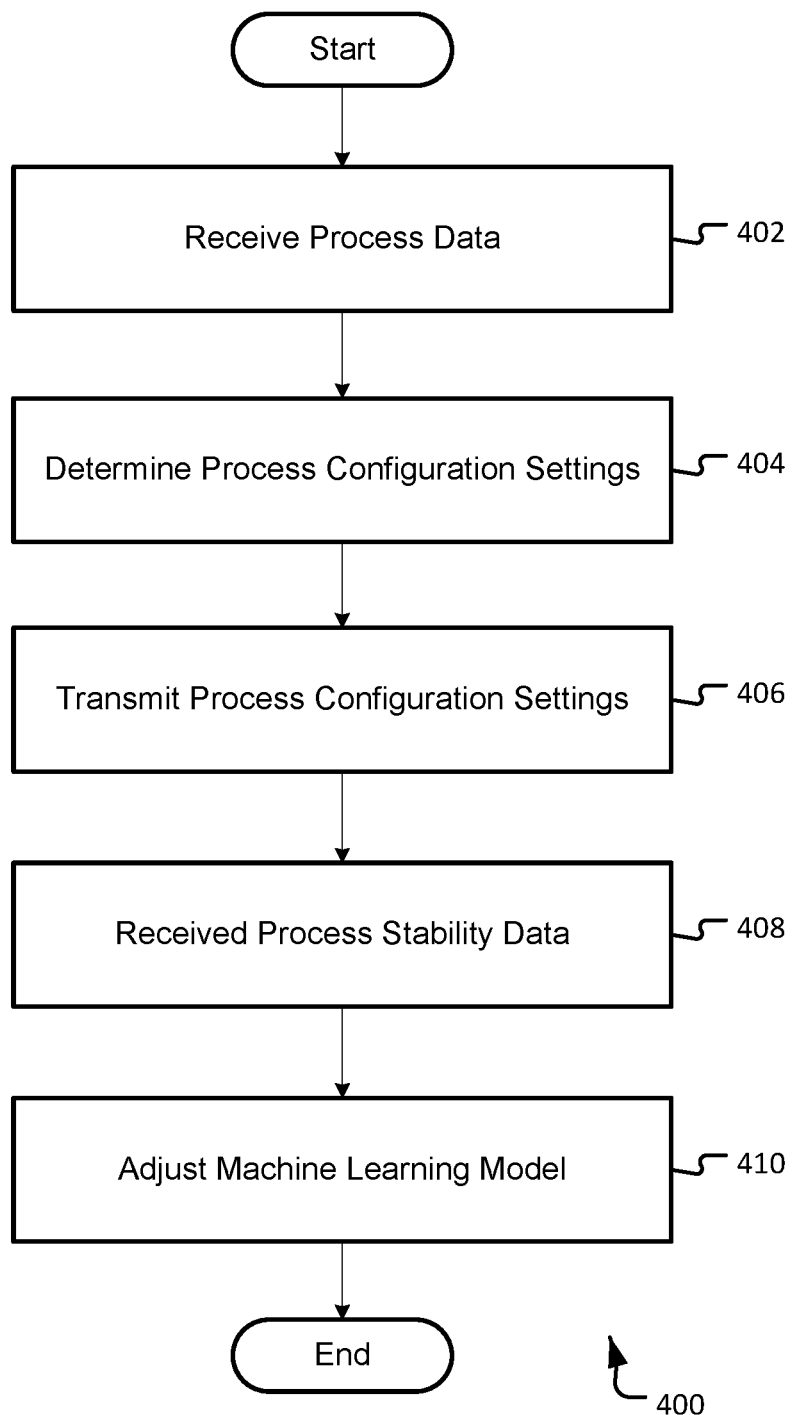
FIG. 4 illustrates an alternate example method for determining exploit prevention software settings using machine learning as described herein.

FIGS. 3 and 4 illustrate example methods for determining exploit prevention software settings using machine learning, as described herein. In aspects, methods 300 and 400 may be executed by an exemplary system such as system 100 of FIG. 1 and system 200 of FIG. 2. In examples, methods 300 and 400 may be executed on a device comprising at least one processor configured to store and execute operations, programs or instructions. However, methods 300 and 400 are not limited to such examples. In other examples, methods 300 and 400 may be performed by a remote application or service. In yet other examples, methods 300 and 400 may be executed (e.g., computer-implemented operations) by one or more components of a distributed network, such as a web service or distributed network service (e.g. cloud service).

Example method 300 begins at operation 302 where a list of running processes is obtained. In aspects, a computing device comprising exploit prevention software may be running one or more processes corresponding to one or more executable files. A process identification utility/device, such as identification engine 202, may have access to the processes and may be used to evaluate the processes. Evaluating the processes may involve determining, for example, currently executing processes, processes created and/or terminated over a particular time period, process states, process metadata, etc. Based on the evaluation, a list of processes currently running on the computing device may be generated or obtained. The process identification utility may identify metadata for one or more processes in the list of processes. The process metadata may include process name and/or identifier, methods and/or functions used by a process, objects used during execution of the process, and the like. The process metadata may be included in the list of processes or otherwise associated with the list of processes. The list of processes (and process metadata) may be arranged or prioritized according to one or more criteria, such as process owner, process identifier, process priority, process resource allocation/usage, process identifier, process security, process runtime, etc. In some aspects, the processes (and process metadata) in the list of processes may be converted (individually or collectively) into a hash or secure value using a hash or digest generating utility/device, such as hash generator 204. The hash or digest generating utility/device may apply one or more algorithms, functions, or rule sets to a process and/or process metadata for security or formatting reasons. The hash(es) may comprise or represent, for example, sections of a file associated with the process, resources accessed by the process, strings used in (or output by) the process, objects used during execution of the process, etc.

At operation 304, the list of processes may be provided to a machine learning system for providing or facilitating exploit prevention. In aspects, the list of processes and/or the process metadata may be provided to a machine learning system configured to determine safe or optimized configuration setting for each received process. The machine learning system may be located remotely from the computing device, such as in a server cluster or cloud-based environment. Alternately, the machine learning system may be located locally on the computing device. The machine learning system may apply the received process data (e.g., the list of processes, process metadata, and/or hash(es)) to a machine learning model, such as exploitation prevention model 206. The machine learning model may be (or have been) trained using one or more sets of labeled and/or unlabeled training data. The training data may comprise hash data, configuration settings, and/or decision logic for selecting configuration settings. The machine learning model may evaluate the process data and output exploitation prevention configuration settings for each process associated with the process data. In examples, determining exploitation prevention configuration settings may comprise comparing the process data to one or more data sources, such as exploit prevention software/services, lists of known processes/configuration settings, lists of known hashes, etc. As one example, the hash value in received process data may be compared to hash values retrieved from an exploitation prevention service. If the hash in the process data matches (or approximately matches) a hash from the exploit prevention service, a process configuration setting associated with the hash from the exploit prevention service may be assigned to (or selected for) the hash in the process data. In aspects, the process configuration settings output by the model may be provided to the exploit prevention software (or a separate component) of the computing device.

At operation 306, the process configuration settings may be applied to the computing device. In aspects, the process configuration settings provided by the machine learning model may be applied to the computing device by a utility/device, such as monitoring engine 208. Applying the exploitation prevention configuration settings may comprise restarting the computing device, restarting one or more processes or applications/services, downloading or installing an update or patch associated with the process, modifying previously-configured configuration settings, or the like. For example, a process configuration setting for a process of an executable file may be applied to the executable file. As a result, one or more configuration settings for the executable file may be modified, and the executable file may need to be restarted (or recompiled) in order for the new configuration settings to be implemented. In some aspects, applying the exploitation prevention configuration settings may further comprise updating a file, (such as change log or a versioning file) to track date/time, configuration settings version, update reason, or the like.

At operation 308, processes with updated process configuration settings may be monitored. In aspects, a monitoring utility/device, such as monitoring engine 208, may be associated with at least one of the computing device and the machine learning system. For example, the monitoring utility/device may be incorporated into the exploit prevention software of the computing device. The monitoring utility/device be configured to monitor processes of the computing device. Monitoring the processes may comprise collecting system/process statistics for the computing device, collecting performance statistics for individual processes, evaluating process statuses, evaluating process and event files, evaluating checkpoints in the executing code, etc. In at least one aspect, the monitoring utility/device and the identification utility/device may be the same utility/device. The processes and/or process statistics monitored may be predefined by a user, specified in a configuration file, or the like. Alternately, the processes and/or process statistics monitored may be dynamically determined by the monitoring utility/device. For example, a process may be monitored if the monitoring utility/device determines the process configuration setting assigned to the process possesses a value indicating the process is to be monitored or a value indicating the process is below a predetermined threshold. Such a value may include a trustworthiness rating/score, a stability rating/score, a label (such as "monitor" or "do not monitor"), etc. In aspects, the information collected by monitoring may be different for one or more processes. For example, only (or primarily) resource utilization statistics may be collected for a first process, whereas only (or primarily) process exit values may be monitored for a second process. The monitoring utility/device may collect and/or store the monitored data in one or more data stores.

In some aspects, the monitoring utility/device may react to detected events. For example, the monitoring utility/device may detect that one or more processes have prematurely terminated, generated exceptions, or are otherwise unstable. Based on the determination, the monitoring utility/device may reduce come aspect of the exploit protection techniques applied to the process(es). As a specific example, the monitoring utility/device may increase the resources (e.g., libraries, memory address space, etc.) available to a process, and restart the process. The monitoring utility/device may continue to monitor and adjust the exploit protection of the process until the process is stable or until the process terminates without error.

At operation 310, the monitored data may be transmitted to the machine learning system. In aspects, the monitored data (or portions thereof) may be provided to (or be made accessible to) a machine learning system. For example, the monitored stability data for one or more processes may be provided to the machine learning system. The machine learning system may be the machine learning system previously described or a separate machine learning system/service. In aspects, the machine learning system may evaluate monitored data using an evaluation utility/device, such as stability evaluation engine 210. The evaluation may determine, for example, the stability or health of one or more of the monitored processes, and may generate a metric or label for the process configuration setting corresponding the monitored process(es).

Example method 400 begins at operation 402 where process data is received. In aspects, a machine learning system may receive process data for a list of processes running on a computing device. The machine learning system may be configured to determine and/or provide one or more exploit prevention techniques. After receiving the process data, the machine learning system may process the process data. Processing the process data may comprise parsing the process data (or using other known identification techniques) to identify, for example, one or more process identifiers or hashes/digests representing processes in the process data, or metadata associated with the process data. The metadata may include process names and/or identifiers, methods and/or functions used by a process, objects used during execution of the process, and the like. The processed data (or portions thereof) may be used to identify or generate one or more exploit prevention techniques.

At operation 404, process configuration setting may be determined. In aspects, the machine learning system may use the processed process data to determine exploit prevention techniques for one or more processes. Determining exploitation prevention configuration settings may comprise comparing the process data (e.g., process/hash identifier, process/hash metadata, etc.) to one or more data sources. Examples of data sources may include exploit prevention software/services, "whitelists" of known safe processes/configuration settings, "blacklists" of known or suspected unsafe processes/configuration settings, virus definitions, and the like. For example, the machine learning system may compare a hash identifier in processed data to an exploit prevention whitelist comprising a list of hash identifiers and corresponding process configuration settings. If an exact match is identified, the process configuration settings for that matched hash identifier may be assigned to the hash identifier in the processed data. If an exact match is not identified, the machine learning system may provide at least a portion of the processed process data as input to one or more machine learning models. The model(s) may be trained to identify and/or determine exploit prevention techniques for one or more processes. The model may apply decision logic (such as a fuzzy matching algorithm or string approximation algorithm) to determine similarities between a hash identifier in the processed process data and hash identifiers accessible in a different storage location (e.g., a cache, a rule set, a data source, etc.). The process configuration settings for the hash identifier determined by the model to be most similar may be assigned to the hash identifier in the processed data.

In some aspects, two or more different process configuration settings may be associated with the same process. For example, the machine learning system and/or the model may identity a plurality of different process configuration settings for a single process or hash identifier. The plurality of different process configuration settings may represent configuration settings from different data sources, various versions of the same configuration settings, various chronological instances of the same configuration settings, or the like. In such aspects, a process configuration setting may be selected based on one or more criteria. Such criteria may include a ranking or priority of a data source, the recency (e.g., creation time/data or modification time/date) of the process configuration settings, stability statistics related to the process configuration settings, and the like. In at least one alternate aspect, a list of available configuration setting may be provided to a user via an interface component, such as a user interface. The interface component may enable the user to select or otherwise indicate a configuration setting for a process/hash identifier. The machine learning system or the model may associate the selected/indicated configuration setting with the process identifier, and store the association information in a storage location.

At operation 406, process configuration settings may be provided to a computing device. In aspects, the process configuration settings for one or more settings in the process data received from the computing device may be provided to the computing device. The computing device may apply the process configuration settings for one or more processes and perform one or more actions to ensure the process configuration settings are put into effect (e.g., restart the computing device or process, recompile an executable file, etc.). The computing device may monitor and collect stability and/or health data for at least the processes corresponding to the recently applied process configuration settings. In examples, monitoring the processes may comprise collecting system/process statistics for the computing device, collecting performance statistics for individual processes, evaluating process statuses, evaluating process and event files, evaluating checkpoints in the executing code, etc.

At operation 408, process stability data may be received. In aspects, the machine learning system may receive monitored process data from the computing device or a device associated with the computing device. The machine learning system may evaluate the monitored process data using an evaluation utility/device, such as stability evaluation engine 210. The evaluation may determine, for example, the stability or health of one or more of the monitored processes. Evaluating the monitored process data may comprise analyzing aspects of the system performance of the computing device (e.g., system/process uptime and resource utilization, task execution speed and quality, security events, etc.), comparing the monitored data to previously monitored data, comparing the monitored data to benchmark data, performing trend analysis and/or creation, etc. As a specific example, the evaluation utility/device may compare a set of process stability data (e.g., average process runtimes, number of process crashes, number of reported errors/exceptions, process exit values, etc.) to a set of process stability data from a previous monitoring period to determine whether processes (or the system) have become more or less stable. In some aspects, the evaluation utility/device may generate metrics or labels for the monitored data based on the evaluation of the monitored data. The metrics or labels may indicate a level of stability, priority, or recency for a process or process configuration setting. For instance, a process configuration setting recently applied to a monitored process of a computing device, may reduce the number of crashes or exceptions reported for the monitored process. As a result, the process configuration setting may be determined to be an improvement over a process configuration setting applied to the process. The improvement may be denoted with a label such as "more stable" or a stability score that exceeds the stability score of the previous process configuration setting.

At operation 410, a machine learning model may be adjusted based on the process stability data. In aspects, monitored process information (e.g., health/stability information for one or more processes, metrics/labels generated in operation 408, and the like) may be provided as input to a machine learning model. The machine learning model may be machine learning model previously described or a different machine learning model. As a result of providing the monitored process information to the machine learning model, the machine learning model may be trained or adjusted. Such training/adjustment may enable the machine learning model to more efficiently and/or accurately correlate process configuration settings with received process data (e.g., process identifiers, hash identifiers, etc.). For example, the machine learning model may have access to a set of historical process stability statistics and process configuration settings. Upon receiving a current set of process stability statistics and process configuration settings, the machine learning model may determine one or more of the current process configuration settings is more stable than one or more of the historical process configuration settings. In accordance with this determination, the machine learning model may update or replace the historical process configuration settings with the current process configuration settings; thus, adjusting/training the machine learning model. Alternately, the machine learning model may receive a current set of process stability statistics and process configuration settings indicating a decrease in process and/or system stability. In accordance with this determination, the machine learning model may update or replace the current process configuration settings with a previous or alternative version of the process configuration settings; thus, reducing the protection applied to the process associated with the process configuration settings.

Figure 5:
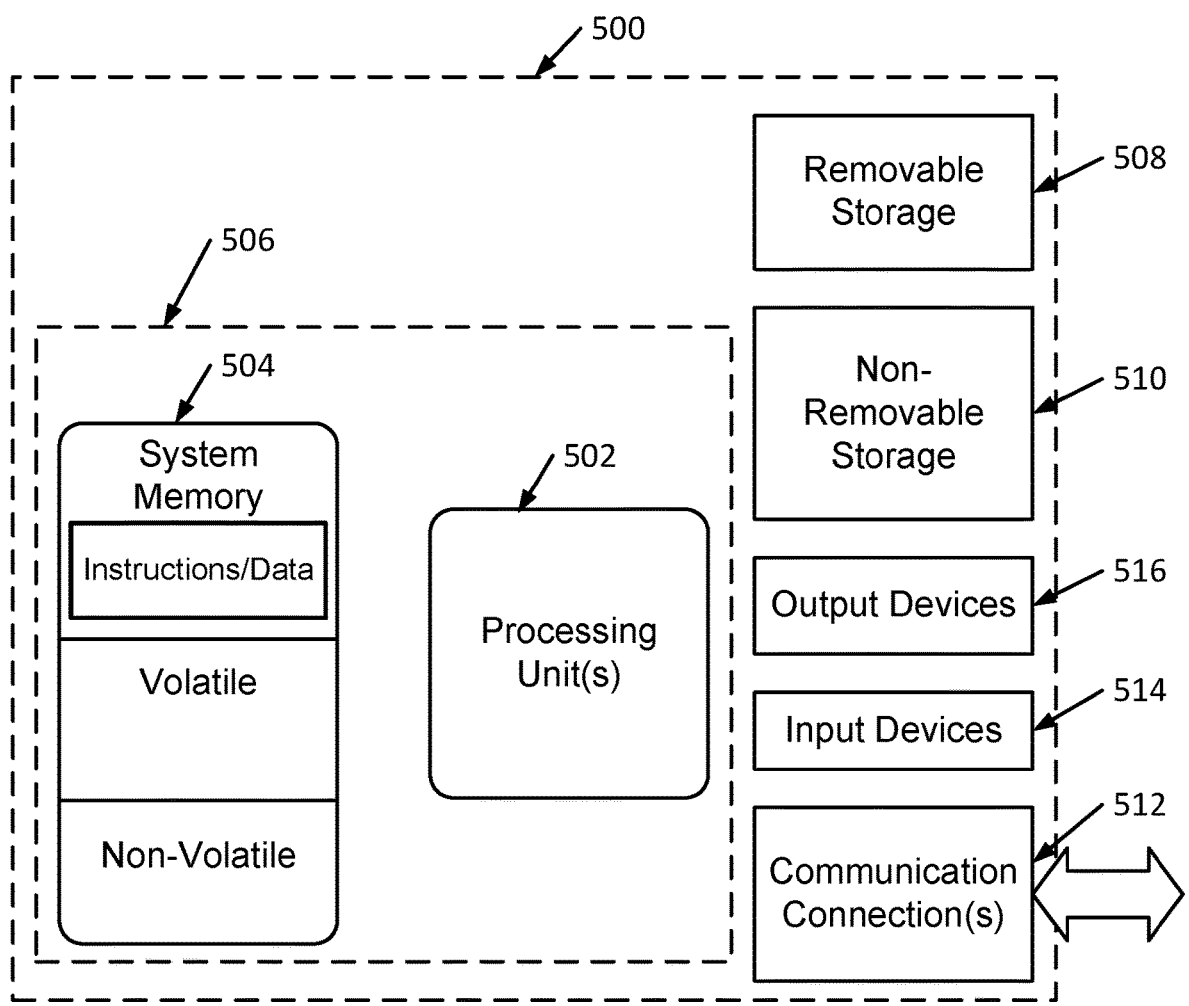
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, notification data, anti-exploit code/data, instructions to perform the methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method comprising:
      executing, on a computing device, exploit prevention software and one or more protected processes;
      obtaining process information for the protected processes running on the computing device, each of the protected processes corresponding to an executable file running on the computing device;
      transmitting the process information for the protected processes to a machine learning system for exploit prevention;
      applying, to exploit prevention software on the computing device, exploit prevention configuration settings for the protected processes which are received from the machine learning system;
      monitoring process stability data for one or more protected processes corresponding to the applied exploit prevention configuration settings, wherein the process stability data represent process stability of the one or more protected processes after applying the exploit prevention configuration settings for comparison by the machine learning system to previously monitored stability data for the one or more protected processes to determine whether the one or more protected processes have become more or less stable, and wherein the process stability data relates to average process runtimes and number of process crashes; and transmitting the process stability data to the machine learning system.

2. The system of claim 1, wherein the process information comprises metadata for the one or more protected processes, wherein the metadata corresponds to at least one of a process identifier, methods or functions used by the one or more protected processes, and objects used during execution of the one or more protected processes.

3. The system of claim 1, wherein obtaining the process information comprises generating one or more hash values for the protected processes, and wherein the one or more hash values are transmitted to the machine learning system.

4. The system of claim 1, wherein the exploit prevention configuration settings were generated using the process information, and comprise at least one configuration setting for each protected process identified in the process information.

5. The system of claim 1, wherein applying the received exploit prevention configuration settings comprises at least one of: restarting the computing device, restarting one or more protected processes, modifying previously-configured configuration settings, and recompiling a file.

6. The system of claim 1, wherein monitoring the process stability data comprises at least one of: collecting system health statistics for the computing device, collecting performance statistics for the one or more protected processes, evaluating process status, evaluating event files, and evaluating checkpoints in executing code.

7. The system of claim 1, wherein the method further comprises:
evaluating the process stability data; and
when the process stability data indicates a decrease in the process stability of one or more protected processes, reducing, by the computing device, exploit protection provided by the exploit prevention configuration settings.

8. A system comprising:
at least one processor;
and memory coupled to the at least one processor, the memory comprising computer executable instructions that, when executed by the at least one processor, performs a method comprising:
executing, on a computing device, exploit prevention software and one or more protected processes;
receiving, at a machine learning system, process information for the protected processes running on the computing device, each of the protected processes corresponding to an executable file running on the computing device;
based on the process information for the protected processes, determining exploit prevention configuration settings for the one or more protected processes for implementation by exploit prevention software;
transmitting the exploit prevention configuration settings for the protected processes to the computing device for application by the computing device to the exploit prevention software;
receiving process stability data from the computing device, wherein the process stability data represent process stability of the one or more protected processes after applying the exploit prevention configuration settings to the exploit prevention software, and wherein the process stability data relates to average process runtimes and number of process crashes of the protected processes;
comparing the received process stability data for the one or more protected processes corresponding to the applied exploit prevention configuration settings to previously received process stability data to determine whether the one or more protected processes have become more or less stable; and
adjusting a machine learning model using the process stability data.

9. The system of claim 8, wherein the process information comprises one or more hash values and metadata for the one or more protected processes in the list of processes.

10. The system of claim 9, wherein determining the exploit prevention configuration settings comprises comparing the hash values to one or more data sources, wherein the one or more data sources comprise a set of hash values and corresponding exploit prevention configuration settings.

11. The system of claim 10, wherein, when the comparison determines a match between the one or more hash values and the set of hash values, the exploit prevention configuration settings corresponding to the matched hash value in the set of hash values is assigned to the respective hash value in the one or more hash values.

12. The system of claim 8, wherein determining the exploit prevention configuration settings comprises providing the process information to a machine learning model configured to generate the exploit prevention configuration settings.

13. The system of claim 12, wherein generating the exploit prevention configuration settings comprises:
determining a first hash value in the process information;
using an approximation algorithm to determine at least a second hash value similar to the first hash value; and
assigning a exploit prevention configuration setting associated with the second hash value to the first hash value.

14. The system of claim 8, wherein the determined exploit prevention configuration settings are presented on a user interface, wherein the user interface is configured to receive a selection of one or more of the determined exploit prevention configuration settings.

15. The system of claim 8, wherein the process stability data corresponds to at least one of: process uptime, resource utilization, task execution speed, task completion satisfaction, and security events.

16. The system of claim 8, wherein the method further comprises evaluating the process stability data, wherein evaluating the process stability data comprises at least one of: comparing the process stability data to previously received process stability data, comparing the process stability data to benchmark process stability data, and performing trend analysis on the process stability data.

17. The system of claim 16, wherein evaluating the process stability data further comprises:
generating one or more metrics for the process stability data; and
applying the one or more metrics to the process stability data, wherein the one or more metrics indicate at least one of a level of stability, a priority, and a recency for a exploit prevention configuration setting.

18. The system of claim 8, wherein adjusting the machine learning model comprises training the machine learning model to provide improved exploit prevention configuration settings.

19. The system of claim 18, wherein improved exploit prevention configuration settings reduce at least one of: a number of process crashes and a number of process errors generated.

20. A system comprising:
at least one processor; and
memory coupled to the at least one processor, the memory comprising computer executable instructions that, when executed by the at least one processor, performs a method comprising:
  executing, on a computing device, exploit prevention software and one or more protected processes;
  obtaining process information for the protected processes running on the computing device, each of the protected processes corresponding to an executable file running on the computing device;
  transmitting the process information for the protected processes to a machine learning system for exploit prevention;
  based on the process information, determining exploit prevention configuration settings for the one or more protected processes for implementation by exploit prevention software;
  transmitting the exploit prevention configuration settings to the computing device;
  applying, to the computing device, the exploit prevention configuration settings;
  monitoring process stability data for the one or more protected processes corresponding to the applied exploit prevention configuration settings, wherein the process stability data represent process stability of the one or more protected processes after applying the exploit prevention configuration settings, and wherein the process stability data relates to average process runtimes and number of process crashes;
  transmitting the process stability data to the machine learning system;
  comparing the monitored process stability data for the one or more protected processes corresponding to the applied exploit prevention configuration settings to previously monitored process stability data for the one or more protected processes to determine whether the one or more protected processes have become more or less stable; and
  adjusting a machine learning model using the process stability data.

* * * * *